Feb. 10, 1970 A. F. DEMING 3,495,143
PLURAL MOTOR CONTROL SYSTEM INCLUDING A REMOTE
POSITIONING MOTOR AND A LOCAL INDICATING MOTOR
SYNCHRONOUS THEREWITH
Filed June 17, 1964

INVENTOR.
ANDREW F. DEMING
BY Woodling, Krost,
Granger and Rust
ATTORNEYS

United States Patent Office 3,495,143
Patented Feb. 10, 1970

3,495,143
PLURAL MOTOR CONTROL SYSTEM INCLUDING A REMOTE POSITIONING MOTOR AND A LOCAL INDICATING MOTOR SYNCHRONOUS THEREWITH
Andrew F. Deming, Alliance, Ohio, assignor to Consolidated Electronics Industries Corp., a corporation of Delaware
Continuation-in-part of application Ser. No. 300,838, Aug. 8, 1963. This application June 17, 1964, Ser. No. 375,893
Int. Cl. H02p 5/52
U.S. Cl. 318—18
15 Claims

ABSTRACT OF THE DISCLOSURE

The disclosure relates to a remote control antenna rotator driven by a first motor. A manual indicator knob moves a first potentiometer and unbalances an electrical bridge, the output thereof energizes relays to control the selected direction of rotation of the first motor. This drives the antenna in the desired direction and at the same time this first motor mechanically drives a second potentiometer electrically connected in the bridge circuit toward restoring the bridge circuit to a balanced condition. Upon restoration of balance, the bridge circuit reaches a null and the entire circuit is de-energized including the relays and the first motor. Concurrently with energization of the first motor, a second motor is energized in parallel therewith which drives a movement indicator. This shows that the rotator is turning and this second motor is de-energized by a cam and switch arrangement upon the conjunction of the positions of the manual indicator knob and the movement indicator.

---

This case is a continuation-in-part of application Ser. No. 300,838, entitled "Phase Sensitive Circuit" filed Aug. 8, 1963, now abandoned.

The invention relates in general to rotator devices and more particularly, to a remotely controllable rotator such as an antenna rotator which may be controlled as to desired positions and which indicates the fact of rotation as well as the actual position thereof.

Many rotator devices are on the market and several have been devised for rotating output shafts such as adapted to hold an antenna. This may be a television antenna, for example, or other receiving antenna such as citizens band or amateur band antennas. In television reception, one normally knows the direction to the transmitting antenna and, hence, in many cases a simple rotator which will rotate the antenna to a desired orientation is satisfactory. In other cases such as in citizens band reception or amateur radio reception, one does not always know the direction to the source of the signal and further, such source may be mobile to thus change its orientation from the receiver. In such cases, it is oftentimes desirable to be able to rotate the antenna while watching a field strength or "S" meter on the receiver and to stop the rotator when the field strength meter reaches a maximum.

An object of the invention is to provide a rotator to achieve the above-mentioned result.

Another object of the invention is to provide a rotator with extreme accuracy and accuracy of indication of the direction of the antenna.

Another object of the invention is to provide a rotator with an indicator which will show the approximate direction of the rotator while it is being turned.

Another object of the invention is to provide a rotator with a first indicator for manually indicating the desired direction and providing a second indicator to indicate the actual position and the fact of movement of the rotator.

Another object of the invention is to provide a moving pointer on a control box sweeping through 360 degrees of arc to provide to the user a sense of motion corresponding approximately to rotation of the output shaft.

Another object of the invention is to provide an indicator system where all the elements of the system are added to the control box only so that existing users of remotely controlled rotators need not exchange the rotators but only the control box, thus eliminating the requirement to remove rotators from existing masts to equip themselves with the new system.

Another object of the invention is to provide a remote control and indicator unit for a rotator unit wherein a first indicator controls the ultimate position of a rotator output shaft and a second indicator indicates the actual position and the movement of the rotator output shaft.

Figure 1:
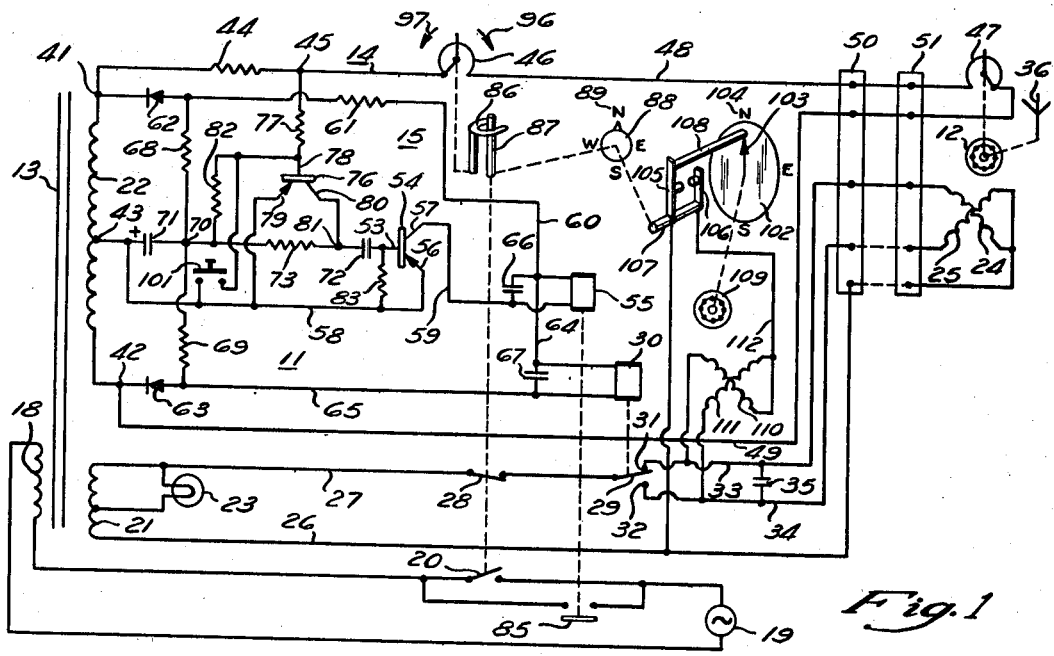
Figure 2:
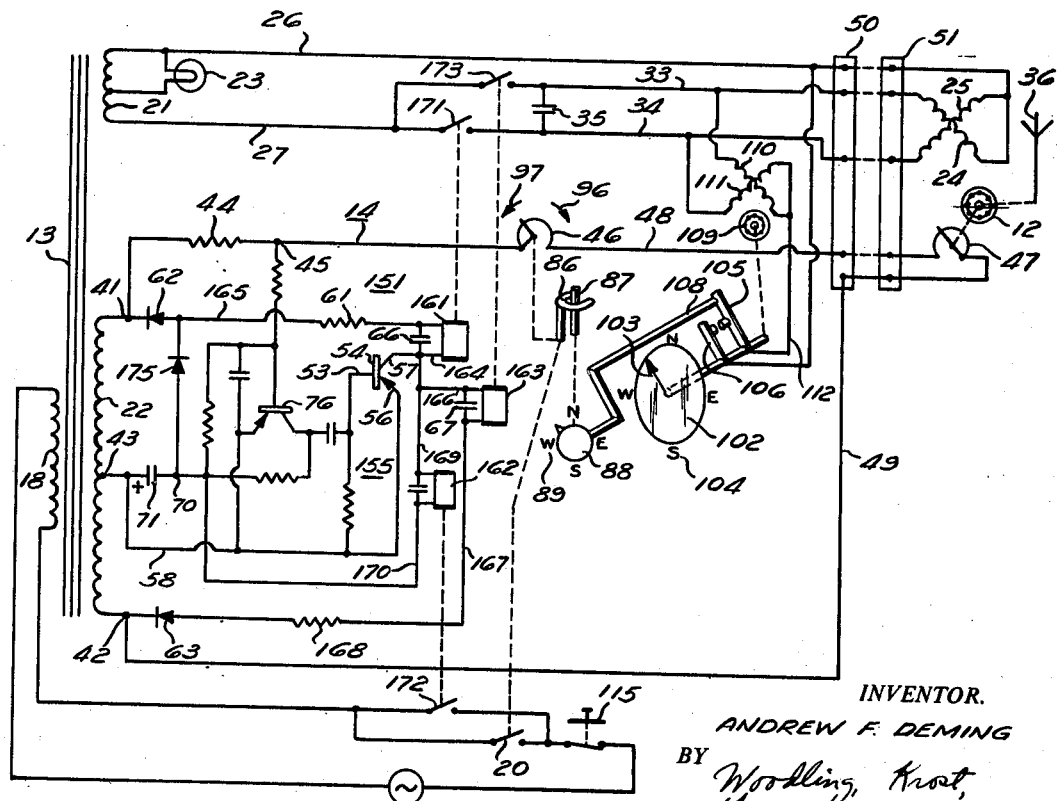

Other objects and a fuller understanding of the invention may be had by referring to the following description and claims, taken in conjunction with the accompanying drawings, in which:

FIGURE 1 is a schematic diagram of a preferred embodiment of the invention; and, FIGURE 2 is a schematic diagram of modification of the invention.

The circuit of FIGURE 1 shows the preferred embodiment of the invention which has been applied, for purposes of explanation only, to an antenna rotator. FIGURE 1 shows a phase sensitive circuit 11 used to control a first electric motor 12. The circuit of FIGURE 1 includes, generally, a transformer 13 energizing the motor 12 and additionally a bridge circuit 14 and an amplifier circuit 15.

The bridge circuit 14 is a balanceable circuit which has an output with a normal or balanced condition and which may be variable in either direction from this normal condition. The output from this bridge controls the energization and direction of rotation of the motor 12. The transformer 13 has a primary 18 energized from an alternating voltage source 19 through first manual switch contacts 20. The transformer has first and second secondaries 21 and 22 with the first secondary 21 energizing a pilot lamp 23 and connected to energize motor windings 24 and 25. A conductor 26 extends from the secondary 21 to a common terminal of the motor windings 24 and 25 and a conductor 27 extends from the other end of the secondary 21 through manual switch second contacts 28 and through single pole double throw contacts 29 of relay 30 selectively through contacts 31 and 32 and through conductors 33 and 34 selectively to the motor windings 24 and 25. A capacitor 35 is connected across the conductors 33 and 34 to provide a leading or lagging phase current to the motor winding 25 relative to motor winding 24. By this means the rotor of the induction motor 12 may be rotated selectively in either direction to rotate an output shaft of a load shown as an antenna 36, through suitable speed reduction means, not shown.

The bridge circuit 14 is energized from end terminals 41 and 42 of the transformer secondary 22, which secondary also has a mid-tap 43. The bridge circuit 14 also includes a first impedance 44 and an output terminal 45 and first and second variable impedances shown as potentiometers 46 and 47 connected in series across the end terminals 41 and 42. Thus, the first impedance 44 is a first leg of the alternating current bridge 14 and the first and second potentiometers 46 and 47 connected in series by conductors 48 and 49 constitute the second leg of this bridge. The two halves of the secondary 22 may be considered as the voltage source for the bridge plus the third and fourth legs of this bridge as well. The mid-tap 43 is thus the second output terminal of this bridge. All five conductors 26, 33, 34, 48 and 49 may pass through terminal strips 50 and 51, and thus it will be seen that the antenna rotator or load motor 12 may be remotely connected to the phase sensitive circuit 11 by a five conductor cable.

The output terminals 43 and 45 supply a phase sensitive input signal to a common amplifier, in this case shown as a transistor 54, as a part of the amplifier circuit 15. The motor 12 is a load responsive to two different phase conditions and as controlled through the relay 30 and a relay 55.

The transistor 54 has a base 53, and emitter 56 and collector 57. The emitter 56 is connected by a conductor 58 to the mid-tap 43. The collector 57 is connected by a conductor 59 through the coil of the relay 55, a conductor 60, a voltage dropping resistor 61 and through a first diode 62 to the first end terminal 41. The collector 57 is also connected through the conductor 59, the coils of relays 55 and 30 in series by means of a conductor 64 and a conductor 65 through a second diode 63 to the end terminal 42. Filter capacitors 66 and 67 are connected across the coils of relays 55 and 30, respectively.

The first and second diodes 62 and 63 supply a DC voltage by means of filter resistors 68 and 69 connected in series across the anodes of the diodes 62 and 63. The junction 70 between the resistors 68 and 69 is connected through a filter capacitor 71 to the mid-tap 43. The polarity of the diodes 62 and 63 makes the junction terminal 70 negative relative to the mid-tap 43. The base 53 of the transistor 54 is connected through a coupling capacitor 72 and a resistor 73 to the terminal 70.

A transistor pre-amplifier 76 may be provided in the amplifier circuit 15 for added sensitivity. Although such pre-amplifier may be omitted where coarse control is sufficient or where an impedance matching transformer is used. The bridge output terminal 45 is connected through a current limiting resistor 77 to the base 78 of the transistor 76 and the emitter 79 of the transistor 76 is connected to the mid-tap 43, which is the other output terminal of the bridge. Accordingly, the bridge output is applied to the input electrodes of the transistor 76. The collector 80 of the transistor 76 is connected to a terminal 81 at the junction of capacitor 72 and resistor 73. Accordingly, the output circuit of the transistor 76 may be traced from the positive DC source terminal 43 through the emitter 79, the collector 80 and the resistor 73 to return to the DC source negative terminal 70. Accordingly, resistor 73 is the load resistor of the pre-amplifier transistor 76 and is the source of input signals supplied through the coupling capacitor 72 to the main transistor amplifier 54.

The relay 55 actuates hold-in contacts 85 which are normally open and which are in parallel with the first manual switch contacts 20, to maintain the transformer 13 energized after energization of the relay 55. The first potentiometer 46 may be the control potentiometer and is one example of a variable impedance which controls the phase of the input signals. The movable blade of this first potentiometer 46 is moved through a lost motion means depicted as a yoke 86 and a pin 87 therebetween. A manual control knob 88 moves the potentiometer 46 through this lost motion means 86–87. The knob 88 may cooperate with a scale or other indicia 89 to indicate the desired rotational direction of the motor driven antenna 36. The lost motion means 86–87 may take one of many forms, for example, it may be that as shown in Patent 3,126,506, issued March 26, 1964. Movement of the knob 88 first takes up the lost motion and then moves the movable blade of the poentiometer 46. The manual knob, in moving the potentiometer 46, may be considered directional control impedance means to control the direction of rotation of motor 12. As the lost motion means 86–87 is actuated, the first and second manual switch contacts 20 and 28 are actuated. This movement opens switch contacts 28 and closes contacts 20, and release of the knob 88 performs the opposite function, namely, to open contacts 20 and close contacts 28. The motor 12 is connected to drive the second potentiometer 47 for a follow-up or closed loop servomotor system.

A push button switch 101 may be connected between the base and emitter of the transistor 76 to short the same and to thus provide a zero output from the bridge circuit 14. A movement indicator 102 may be in the form of a disc with a pointer 103 cooperating with indicia 104. Alternatively, this may be the same indicia 89 which cooperates with the manual indicator knob 88. Manual switch blades 105 and 106 form a circuit controller means and are insulatedly mounted on a shaft 107 which is coaxial with the movement indicator disc 102. An actuator cam 108 is carried for movement with the indicator disc 102 and is cooperable with the manual switch blade 105 to open the contacts on the switch blades 105 and 106 upon conjunction of the position of the movement indicator disc 102 and the switch blades 105 and 106. The shaft 107 is connected for rotation directly with manual indicator knob 88. Thus, the switch 105–106 is manually actuable by the knob 88 and is cam actuable by the cam 108. As shown in FIGURE 1, the manual indicator knob 88 is shown pointing to the north as is the indicator disc 102. In this conjunction position, the cam 108 opens the contacts on the switch blades 105 and 106 but for all the other relative positions of the switch blades 105–106 and actuator cam 108, the contacts of the switch blades 105–106 will be in engagement.

A second electric motor 109 is connected to rotate the indicator disc 102 through suitable speed reduction gearing, now shown. This second motor 109 has windings 110 and 111 which are interconnected at a common conductor 112 which is connected to the switch blade 106. The switch blade 105 is connected to the conductor 26. The other end of winding 110 is connected to conductor 33 and the other end of winding 111 is connected to conductor 34.

OPERATION

The circuit of FIGURE 1 may be operated by grasping the manual knob 88 and moving it to a new selected position for the antenna 36. The potentiometer 47 may be the type which will permit a full 360 degree rotation or continuous rotation and alternatively, the potentiometer 47 may be of the ordinary type of about 300 degree rotation but geared to the motor 12 so that a full 360 degree rotation of the antenna 36 establishes a full 300 degree rotation between stops of the potentiometer 47.

Assume that the antenna is oriented toward the east and the knob 88 is grasped and rotated clockwise, as per arrow 96, to the south position. A first movement of the knob 88 opens the manual switch contact 28 and a further movement closes the manual switch contact 20, by means of the lost motion connection 86–87 before the potentiometer 46 is moved. This lost motion may be only one to three degrees, for example, just sufficient to actuate the switches 20 and 28. The closing of the first manual switch contact 20 energizes the primary 18 and the entire transformer 13. The opening of the second manual switch contacts 28 prevents enegization of the motors 12 and 109 at this time. The energization of the transformer secondary 22 energizes both the bridge circuit 14 and the amplifier circuit 15. The clockwise movement of potentiometer 46 decreases the resistance thereof and hence decreases the impedance in this second leg of the bridge which includes potentiometers 46 and 47. Accordingly, the alternating current bridge 14 will have an output voltage at terminals 43 and 45. This output voltage will either be in phase with the voltage from mid-tap 43 to terminal 41 or from mid-tap 43 to terminal 42. In this case, with the decreasing resistance of potentiometer 46, the potential of terminal 45 will shift in phase to the right, and hence the voltage from mid-tap 43 to terminal 45 will be in phase with the source voltage from mid-tap 43 to end terminal 42. When terminal 41 goes positive, the output terminal 45 will go negative because this output signal is directly out of phase with the reference input voltage from the terminals 42 to 41. Thus, in the first half cycle, when terminal 41 is positive, terminal 45 goes negative. This applies a negative bias to the base 78 of transistor 76 causing this transistor to increase conduction through the load resistor 73. The terminal 81 thus becomes increasingly positive on this half cycle and, hence, the transistor 54 is biased into complete non-conduction.

A bias resistor 82 is connected between the base 78 of transistor 76 and terminal 70. This provides a small leakage current so that transistor 76 is biased into a partially conducting region. A self-bias resistor 83 is connected between the base 53 and emitter 56 of transistor 54, with transistor 54 normally biased in a substantially non-conducting state. This transistor 54 is normally biased by resistor 83 as a self-bias resistor and, hence, the normal condition of this transistor 54 is substantially a non-conducting condition. During the next half cycle of the reference voltage, however, the bridge output voltage at terminal 45 is going positive and this decreases the conduction of transistor 76 to make the terminal 81 less positive or more negative. This more negative voltage swing is applied through the coupling capacitor 72 to the base 53 of transistor 54, hence biasing it into a conducting state. Accordingly, a half wave pulse of current is passed by the transistor 54 in the second half cycle of the reference voltage. This half wave pulse of current passes through the collector 57 and through the coil of relay 55, the voltage dropping resistor 61 and diode 62 to the terminal 41 which is at that time negative. Current cannot flow from the collector 57 through the two relay coils 55 and 30 in series to the terminal 42 because it is at that time positive and the path is open circuited by diode 63. The capacitor 66 across the coil of the relay 55 smoothes these half wave pulses to maintain this relay 55 energized. The contacts 85 of this relay 55 are thus closed to maintain energized the transformer 13. At this time the knob 88 may be released and this will open the contacts 20 but this has no effect on the circuit since in the practical case, the relay 55 will be energized in less than 1/10 second after movement of potentiometer 46 to unbalance the bridge circuit 14.

The relay 30 has not been energized, hence, the closing of contact 28 establishes a motor energization circuit directly to motor winding 24 with leading current supplied through capacitor 35 to the motor winding 25. Accordingly, the motor 12 will run in a clockwise direction to rotate the antenna 36 to the desired south orientation. Also, the potentiometer 47 is rotated clockwise to increase the resistance thereof and upon rebalance of the bridge circuit 14, the output voltage of the bridge fails to a null and thus the relay 55 will become de-energized to open contacts 85 and de-energize the complete circuit 11. This will be where the antenna 36 has been positioned to the desired orientation as established by movement of the potentiometer 46 in this clockwise direction.

When the knob was turned clockwise from the east position to the south position, the switch blades 105 and 106 made contact but this does not start energization of the motor 109 because the switch 28 is open at this time. After the knob has been turned to its new and desired position of the antenna and the knob released, then the switch 28 closes as recited above to start energization of the first motor 12 in the desired direction. Concurrently, the second motor 109 starts rotation. Each motor drives through a speed reduction unit of the same numerical reduction ratio. Both motors have been shown as induction motors and for small two pole motors, the speed may be in the order of 3350 to 3400 r.p.m. under load conditions. Since the motor 109 has a very light load, driving only the indicator disc 102, this motor is running under practically no load conditions and generally will run at a slightly faster speed than the motor 12. Both motors might be synchronous motors and this is satisfactory, although it would increase the cost of the system.

In either event, the motors 12 and 109 are chosen so that the motor 109 runs at least as fast or slightly faster than the motor 12.

The motor 12 has been energized for rotation so that the antenna 36 rotates clockwise and also the motor 109 drives the indicator disc 102 in a clockwise direction.

The rotation of the motor 109 rotates the indicator disc and this gives the user a sense of motion of the antenna 36 because he can observe the indicator disc 102 in its motion from the east direction to the south direction. As the indicator disc 102 approaches its south orientation, the actuator cam 108 will actuate open the switch blade contacts 105–106 at this south orientation. This de-energizes the motor 109. At the same time or shortly thereafter, the antenna 36 reaches its south orientation and the potentiometer 47 also reaches its orientation of balance of the bridge circuit. This de-energizes the relay 55, and the opening of the contacts 85 de-energizes the entire circuit. Thus it will be seen that the manual indicator knob 88 is in conjunction with the position of the indicator disc 102 and this de-energizes the motor 109. Also, the potentiometers 46 and 47 are in a position of conjunction and this de-energizes the motor 12. Since the potentiometers 46 and 47 are in a position of conjunction, this means that the manual indicator knob 88 and the antenna 36 are in a position of conjunction and equating the above two results, one determines that the indicator disc 102 and the antenna 36 are in a position of conjunction.

Now assume that the potentiometer 46 is moved counterclockwise, as shown by arrow 97 in FIGURE 1. This counterclockwise movement increases the resistance of potentiometer 46. This shifts the phase of the terminal point 45 to the left, that is, the bridge output voltage from terminals 43 to 45 is in phase with the voltage from terminals 43 to 41 of the reference voltage. As the potential of terminal 41 swings positive, the potential of terminal 45 also swings positive and this tends to decrease the conduction through the transistor 76. This decreasing current through transistor 76 decreases the current through the load resistor 73 and hence, the potential of terminal 81 is less positive or more negative. This more negative swinging voltage is applied through coupling capacitor 72 to the base 53 of transistor 54 to thus cause conduction of this transistor 54. This current pulse is in the first half cycle of the reference voltage. This pulse of current is passed through the transistor 54 and goes from collector 57 through the two relay coils 55 and 30 in series and through the diode 63 to the terminal 42 which is negative in that half cycle. The capacitors 66 and 67 smooth this half cycle pulse of current to cause continuous energization of the relays 30 and 55.

As before, the energization of relay 55 closes its contact 85 to maintain the entire circuit 11 energized. The energization of relay 30 moves the contact blades 29 to engage the contact 32 and this energizes the motor winding 25 directly and the motor winding 24 with a leading current through the capacitor 35. This is another way of saying that in this energization condition, the motor winding 25 has a lagging current relative to that current through motor winding 24. This is the reverse energization condition to that established with clockwise rotation of potentiometer 46, and accordingly, the motor 12 will rotate counterclockwise to drive the antenna to its newly selected position. This also drives the potentiometer 47 in a counterclockwise direction to rebalance the bridge by decreasing the resistance.

The aforementioned counterclockwise rotation of the knob 88 moves the switch blades 105–106 in a counterclockwise direction and closes these contact blades because they are no longer actuated by the cam 108. The motor 109 will be energized upon closing of the manual switch 28 and since the contact blade 29 is in engagement with the contact 32, this energizes the motor 109 for counterclockwise rotation of the indicator disc 102. When the indicator disc 102 reaches a position of conjunction with the manual indicator knob 88, the actuator cam 108 will open the switch 105–106 to de-energize the motor 109. At the same time or shortly thereafter, the motor 12 will have rotated the antenna 36 and have rotated the potentiometer 47 in a counterclockwise direction sufficiently to cause a rebalance of the bridge for a null condition at the bridge output terminals 43 and 45. This will cause cessation of current conduction through transistor 54 and de-energization of the relays 55 and 30. De-energization of relay 55 de-energizes the entire circuit and de-energization of relay 30 permits its return to its normal condition engaging contact 31. Capacitor 67 may be made of a larger capacity than capacitor 66. This will achieve a longer time constant and will assure that the relay 55 will be the first to pull in and the first to drop out. Since relay 30 will be the last to drop out, this means the contacts 85 of relay 55 will be those which actually interrupt the current and relay contacts 31 and 32 will not interrupt the current, hence, this may be made a light duty relay for economy. Also, this assures that the entire circuit will be de-energized before relay 30 changes its contact condition. Thus, there will not be any last minute reversal of the motor 12 just as the circuit is de-energized.

Additionally, the manual switch 28 performs a desirable function of preventing energization of the motor 12 until the motor direction of rotation has been established. Both the relays 55 and 30 will be energized within about 1/10 second after movement of the potentiometer 46 in a counterclockwise direction. Alternatively, if the potentiometer 46 is rotated clockwise, only relay 55 is energized, as set forth above. Either of these two energization conditions occurs within the aforesaid 1/10 second and, hence, the motor direction of rotation is established within this short period of time after movement of the potentiometer 46. Accordingly, after the knob 88 is moved to the desired new position for the antenna 36, this knob 88 may be released at any time after this 1/10 second and the motor direction of rotation will already have been established. This prevents the motor from starting rotation in one direction and then changing direction immediately thereafter should the relay 30 pull in after the motor started rotating in the opposite direction. Thus, this manual switch 28 provides this desirable function of preventing false initial direction of rotation of the motor 12.

It will be seen that when the input signal to the amplifier is of one phase characteristic, the motor 12 will operate in one direction and when the input signal is of another phase characteristic, the motor 12 will operate in the other direction, both as established by the two separate circuit paths from the common amplifier 54. In many cases, such as in citizens band or amateur radio operation, it is desired to rotate the antenna until a maximum signal strength is observed on a signal strength or "S" meter. At the time of observance of the maximum signal, it is desired to stop the rotator. This may be accomplished by depressing the push button switch 101. This shorts the input to the transistor 76 so that the amplifier 15 has zero output and this will drop out the relay 55 and also the relay 30 should it happen to be energized at this time. The dropping out of the relay 55 opens the relay contacts 85 to de-energize the entire circuit. This stops both motors 12 and 109 and in most cases, there would not be conjunction of the position of the manual indicator knob 88 and the indicator disc 102. To restore synchronism of the two indicators 88 and 102, the operator simply turns the unit on by turning the knob 88 to any position. This closes the switch 20 and starts the motors 12 and 109 operating as outlined above, and all parts will come into conjunction at shutoff.

FIGURE 2 shows a phase sensitive circuit 151 quite similar to that shown in FIGURE 1. This circuit 151 incorporates an amplifier circuit 155 again similar to that shown in FIGURE 11, except for changes in the relay circuit which is the load for the main amplifier 54. This amplifier circuit 155 supplies energy to three relays, 161, 162 and 163. The relay 161 is connected from the collector 57 of transistor 54 through a conductor 164 to coil of relay 161, optional voltage dropping resistor 61 and conductor 165 through diode 62 to the voltage source terminal 41. Capacitor 66 is connected across the coil of relay 161 to maintain this relay closed even though energized with half wave pulses. The coil of relay 163 is connected from the collector 57 of transistor 54 by means of a conductor 166, conductor 167, optional voltage dropping resistor 168 and diode 63 to the voltage source terminal 42. The coil of relay 162 is connected from the collector 57 of transistor 54 by means of a conductor 169 and a conductor 170 to the negative DC voltage source terminal 70. In this circuit of FIGURE 2, each of the three relays controls a normally open single pole, single throw contact. Relay 161 controls contact 171, relay 162 controls contact 172 and relay 163 controls contact 173.

Conductor 27 leading from the secondary 21 leads to one side of both contacts 171 and 173. The other side of contact 173 is connected by conductor 33 to the motor winding 24. The other side of relay contact 171 is connected through conductor 34 to the motor winding 25. The relay contact 172 is connected in the energization line from the AC voltage source 19 to the primary 18 and is connected in parallel with the manual switch contacts 20. The amplifier circuit 155 is shown as having a slightly different DC voltage circuit from that shown in FIGURE 1. A diode 175 replaces the resistor 68 and resistor 69 is eliminated. This shows that the DC voltage source developed across the filter capacitor 71 may be obtained by a half wave rectifier rather than a full wave rectifier. Also, the diode 175 in replacing the resistor 68, provides an additional function of preventing leakage current which might otherwise flow through transistor 54 and through relay coil 161, resistor 61 and through resistor 68 and through the DC voltage source to return to the emitter of transistor 54. If the transistor 54 leaked enough current during its normally non-conducting periods, this might possibly cause energization of relay 161 at undesired phase portions of the reference voltage. Use of this diode 175 prevents such occurrence.

The knob 88 is connected to directly rotate the actuator cam 108. The motor 109 is connected to rotate through suitable speed reduction gearing, not shown, the shaft on which the switch blades 105 and 106 are mounted and also to rotate the indicator disc 102. This is the reverse of the arrangement shown in FIGURE 1 and hence shows that as the knob 88 is rotated, it is merely necessary to have relative rotation between the actuator cam 108 and the manual switch 105–106. Actuator cam 108 cooperates with switch blade 105 as a cam follower in both FIGURES 1 and 2, and thus together from actuator means or cam means. The switch 105–106 is also a circuit controller means. A push button normally closed switch 115 is connected in the supply circuit from the voltage source 19 and when this push button 115 is depressed, this de-energizes the entire system.

OPERATION

The circuit of FIGURE 2 operates in a manner similar to that for FIGURE 1. If the manual knob 88 is moved clockwise, this moves the potentiometer 46 clockwise in the direction of the arrow 96. This decreases the resistance and shifts the phase of the point 45 to be in phase with the voltage from terminal 43 to terminal 42. Again, this will cause conduction through the transistor 54 on a second half cycle relative to the reference voltage. This conduction will energize the relay 161 rather than the relay 163 because it is the terminal 41 which is negative during that half cycle rather than the terminal 42. This energization of the relay 161 closes the contacts 171 thereof for direct energization of the motor winding 25 and leading current energization through capacitor 35 of the motor winding 24. This causes clockwise rotation of the motor 12 and rotation of the antenna 36 toward the desired position. Also, the motor 12 drives the potentiometer 47 toward rebalance of the bridge.

The turn-on of the transistor 54 also energizes the relay 162 since it is supplied with a DC operational voltage from the DC voltage source developed across the filter capacitor 71. Energization of relay 162 closes the contacts 172 thereof and, hence, maintains energized the primary circuit of the transformer 13. Accordingly, the knob 88 may be released to open manual switch 20 and again this energization of the relay 162 will take place within about 1/10 second.

The clockwise movement of the knob 88 moves the cam actuator 108 so that the switch 105–106 is closed. Therefore, this will start the clockwise rotation of both the motor 12 and motor 109. Thus, as the motor 12 is rotating the antenna shaft, the motor 109 is rotating the shaft carrying the manual switch 105–106 as well as the indicator disc 102. This again gives an indication to the user of the movement of the antenna. As the switch 105-106 comes into conjunction with the position of the manual knob 88, this shuts off the motor 109. At the same time or a moment later, the motor 12 will have rotated the antenna to the desired position and also rotated the potentiometer 47 to rebalance the bridge. Upon rebalance of the bridge, the voltage output of the bridge will fall to a null to cause the transistor 54 to cease conduction and thus de-energize the relays 161 and 162. This, of course, de-energizes the entire circuit by opening the relay contacts 172.

If the knob 88 is moved in a counterclockwise direction, this moves the manual potentiometer 46 in a counterclockwise direction as shown by the arrow 97. The phase of the bridge output voltage will then be in phase with the source voltage from terminals 43 to 41. This causes conduction through the transistor 54 in the first half cycle of the reference voltage and will energize the relay 163, since it is the terminal 42 which is negative during those half cycles. The energization of the relay 163 closes contacts 173 and energizes the motor for counterclockwise rotation. Concurrently with the turn-on of the transistor 54, the relay 162 is again energized to close the contacts 172 and maintain the entire circuit energized. The motor 12 runs counterclockwise to move the antenna to the desired position and the potentiometer 47 is also driven counterclockwise to decrease the resistance thereof toward a rebalance of the bridge. The counterclockwise movement of the knob 88 again closes the switch 105–106 so that motor 109 starts running at the same time that motor 12 starts. Again, the indicator 102 gives indication of movement of the antenna 36 and the motor 109 stops upon conjunction of the position of the knob 88 and indicator disc 102. Again, upon bridge rebalance, the transistor 54 ceases conduction to de-energize relays 162 and 163 to de-energize the entire circuit.

The circuit of FIGURE 2 shows how three relays may be energized with the first and third relays controlling the direction of motor rotation and the second relay being always energized whenever there is an output voltage from the bridge. If desired, the circuit of FIGURE 2 may have the relay connections of FIGURE 1. This would be with the elimination of the third relay 163 and its attendant circuit of resistor 168 and diode 63. Accordingly, this would leave only diode 62 in the circuit, excepting the diode 175, which is for the DC voltage source, and this single diode 62 would only be effective to conduct current on half cycles. In such a case with FIGURE 2 modified to embody only relays 161 and 162, the relay 162 would be similar to the relay 55 of FIGURE 1 to control contacts for the primary energization circuit, since this relay 162 is always energized whenever the bridge output voltage is being conducted through transistor 54. Relay 161 would be similar to the relay 30 in FIGURE 1 to selectively control energization to the motor windings 24 and 25 for selected direction of rotation. In such a changed circuit, it will be noted that the two relays 161 and 162 operate on different phase characteristics of the input. Relay 162 actually operates on DC and relay 161 operates on half wave pulses supplied when terminal 41 is negative and when the input signal is in phase with the second half cycle of the reference voltage. Thus, it will be seen that there are two separate circuit paths from the transistor 54 to voltage source means with different phase responsive characteristics so that phase reversal of the input causes phase selective current flow in said separate circuit paths.

The operation of FIGURES 1 and 2 has been described as stating that where the potentiometer 46 is rotated clockwise, for example, then the motor 12 also rotates clockwise. If the potentiometer 46 is of the type which will permit continuous rotation in one direction without any physical stops, then the motor 12 need not rotate in the same rotational direction as the potentiometer 46. Instead, one may rotate the potentiometer in a given direction across the point where this potentiometer changes from maximum to minimum impedance and then the motor will rotate in the appropriate direction, which may be the opposite direction in order to effect a rebalance of the bridge circuit. For example, suppose that the potentiometer had the change from maximum to minimum impedance at the south position and no physical stops were provided, then if one rotated the knob clockwise from the SE to the SW position through a 90 degree arc, then this would first decrease and then increase the impedance which would give a signal, upon release of knob 88, so that the motor would rotate in the opposite direction, namely, counterclockwise, to drive the potentiometer 47 counterclockwise to decrease the impedance thereof toward a rebalance of the bridge. Accordingly, it will be noted that both circuits are follow-up motor control systems which tend to establish a rebalance of the bridge regardless of the direction of upsetting influence in the bridge circuit.

Both circuits show that there is a manual indicator 88 to indicate the desired position of the rotator output shaft and there is also a movement indicator 102 which does two things, it indicates movement of the antenna and also indicates the actual position at that instant of the antenna. The systems both provide a switch to stop the rotator at any particular position and this may not be at the point of conjunction of all three things, namely, the knob 88, the indicator disc 102 and the antenna 36. However, in the circuit of FIGURE 2, just as in the circuit of FIGURE 1, the system may be brought into synchronism merely by again rotating the knob 88 to any position. This will start the entire system and it will shut off with all three things, 88, 102 and 36 in synchronism.

The shutoff of the motor 109 occurs when the indicator knob 88 and the indicator disc 102 are in conjunction. The shutoff of the motor 12 occurs at balance of the bridge which is at a position when the indicator knob 88 and antenna 36 are in conjunction and, thus, these two things being in conjunction show that the antenna 36 and indicator disc 102 are in conjunction.

The changes in each of the above described circuits are all in the remote control and indicator unit, with the rotator unit remaining the same as in the parent case, Ser. No. 300,838, filed Aug. 8, 1963; entitled "Phase Sensitive Circuit," of which this application is a continuation-in-part. This shows the simplicity and ease of supplying only a new remote control and indicator unit, and one need not take down the old rotator unit and install a new one in order to gain the benefits of the present invention.

Although this invention has been described in its preferred form with a certain degree of particularity, it is understood that the present disclosure of the preferred form has been made only by way of example and that

What is claimed is:
1. A rotator assembly comprising, in combination, first and second motors,
circuit means having an output variable in two directions from a normal condition,
a first variable impedance connected in said circuit means and a change in value of said impedance in either direction effecting a change in either direction from normal condition in said circuit means,
means connecting the output of said circuit means to control the direction of rotation of said first motor,
first and second indicators,
means connecting said first indicator to said first variable impedance to change the value thereof as an input signal,
an output shaft,
follow up means,
means connecting said first motor to rotate said output shaft and to actuate said follow up means toward restoring said circuit means toward said normal condition,
controller means,
actuator means for said controller means,
means for connecting said second motor to move said second indicator,
means connecting said actuator means and controller means for relative movement in accordance with movement of said first indicator and with movement of said second motor to actuate said controller means upon conjunction of the position of said first and second indicators,
and means to connect said controller means between said motors to control operation of said second motor in accordance with said first motor.

2. A rotator assembly comprising, in combination, first and second reversible motors,
circuit means having an output variable in two directions from a normal condition,
first and second variable impedances connected in said circuit means and a change in value of impedance of either said first or second impedance effecting a change from normal condition in said circuit means,
means connecting the output of said circuit means to control the direction of rotation of said first motor,
first and second indicators,
means connecting said first indicator to said first variable impedance to change the value thereof as an input signal,
an output shaft,
means connecting said first motor to rotate said output shaft and to change said second variable impedance in value,
circuit controller means,
actuator means for said circuit controller means,
means for connecting said second motor to move said second indicator,
means connecting said actuator means and said circuit controller means for relative movement in accordance with movement of said first indicator and with movement of said second motor to actuate said circuit controller means upon conjunction of the position of said first and second indicators,
means to connect said circuit controller means to control operation of said second motor in accordance with said first motor, whereby movement of said first indicator actuates said circuit controller means and said first variable impedance to effect rotation of said first and second motors and a change in value of said second variable impedance toward restoring said circuit means to said normal condition,
and conjunction of the positions of said circuit controller means and said actuator means de-energizing said second motor, and the restoration of said circuit means to said normal condition de-energizing said first motor to establish conjunction of the position of said output shaft and said first indicator and, hence, conjunction of the position of said second indicator and said output shaft.

3. A rotator assembly comprising, in combination, first and second electric motors,
circuit means having an output variable in two directions from a normal condition,
first and second variable impedance connected in said circuit means and a change in value of impedance of either said first or second impedance effecting a change from normal condition in said circuit means,
means connecting the output of said circuit means to control the direction of rotation of said first motor,
first and second indicators,
means connecting said first indicator to said first variable impedance to change the value thereof as an input signal,
an output shaft,
means connecting said first motor to rotate said output shaft and to change said second variable impedance in value,
switch means,
means connecting said switch means for movement with said first indicator.
actuator means for said switch means,
means for connecting said second motor to move said second indicator and to move said actuator means to actuate said switch means upon conjunction of the position of said first and second indicators,
means to connect said second motor in parallel with said first motor through said switch means, whereby movement of said first indicator moves said switch means and said first variable impedance to effect rotation of said first and second electric motors and a change in value of said second variable impedance toward restoring said circuit means to said normal condition,
and conjunction of the positions of said actuator means and said switch means de-energizing said second electric motor, and the restoration of said circuit means to said normal condition de-energizing said first electric motor to establish conjunction of the position of said output shaft and said first indicator and, hence, conjunction of the positions of said second indicator and said output shaft.

4. A rotator comprising, in combination, a first electric motor,
an output shaft connected for rotation from said motor,
a balanceable circuit,
a first variable impedance in said circuit,
a manual indicator,
movement of said manual indicator in opposite directions changing the value of said variable impedance in opposite directions to unbalance said circuit in either of two directions,
means connecting the output of said circuit to control the selected direction of rotation of said first electric motor,
a second variable impedance,
means connecting said second variable impedance in circuit with said first variable impedance and connected to be changed in value by said first motor in a direction toward rebalance of said balanceable circuit upon the selected direction of rotation of said first electric motor,
a second electric motor,
a movement indicator connected to be driven by said second electric motor,
circuit controller means moved in accordance with said manual indicator,
actuator means driven in accordance with said second electric motor and positioned to act on said circuit controller means to actuate same upon conjunction of the position of said movement indicator and said manual indicator, means to connect said circuit controller means to control energization of said second electric motor in accordance with said first electric motor whereby unbalance of said circuit by said first variable impedance establishes selected directional rotation of said first electric motor to rotate said rotator output shaft in a selected direction and to change the value of said second variable impedance in a selected direction toward rebalance of said balanceable circuit and the concurrent rotation of said second electric motor moving said movement indicator to indicate that said rotator is moving and moving said actuator means toward a position of actuation of said circuit controller means to stop said second electric motor upon said movement indicator and said actuator means reaching the desired position, and rebalance of said balanceable circuit stopping said first electric motor upon said rotator output shaft reaching said desired position for conjunction of the rotator output shaft position, the manual indicator and the movement indicator.

5. A rotator comprising, in combination, a first electric motor, an output shaft connected for rotation from said motor, a balanceable circuit,
a first variable impedance in said circuit,
a manual indicator connected to move to change the value of said first variable impedance,
movement of said manual indicator in opposite directions moving said variable impedance in opposite directions to unbalance said circuit in either of two directions,
means connecting the output of said circuit to control the selected direction of rotation of said first electric motor,
a second variable impedance connected to be changed in value by said first electric motor,
means connecting said second variable impedance in circuit with said first variable impedance and connected to be changed in value by said first motor in a direction toward rebalance of said balanceable circuit upon the selected direction of rotation of said first electric motor,
a second electric motor,
a movement indicator connected to be driven by said second electric motor,
switch means moved in accordance with said manual indicator,
actuator means driven in accordance with said second electric motor and positioned to act on said switch means to open same upon conjunction of the position of said movement indicator and said switch means,
means to connect said second electric motor in parallel with said first electric motor through said switch means, whereby unbalance of said circuit by said first variable impedance establishes selected directional rotation of said first electric motor to rotate said rotator output shaft in a selected direction and to change the value of said second variable impedance in a selected direction toward rebalance of said balanceable circuit and the concurrent rotation of said second electric motor moving said movement indicator to indicate that said rotator is moving and moving said actuator means toward a position of actuation of said switch means to de-energize said second electric motor upon said movement indicator and said actuator means reaching the desired position,
and rebalance of said balanceable circuit de-energizing said first electric motor upon said rotator output shaft reaching said desired position for conjunction of the rotator output shaft position, the manual indicator and the movement indicator.

6. A rotator comprising in combination, a remote control and indicator unit and a rotator unit,
said remote control and indicator unit having output terminals and said rotator unit having input terminals, and conductors interconnecting said input and output terminals,
said rotator unit having a first electric motor connected to said input terminals,
an output shaft connected for rotation from said motor,
said remote control and indicator unit including a balanceable circuit,
a first variable impedance in said circuit,
a manual indicator connected to said first variable impedance,
movement of said manual indicator in opposite directions moving said variable impedance in opposite directions to unbalance said circuit in either of two directions,
relay means connected to said output terminals of said remote control and indicator unit to control the selected direction of rotation of said first electric motor,
said balanceable circuit having an output connected to control said relay means,
said rotator unit including a second variable impedance connected to be driven by said first electric motor,
means connecting said second variable impedance in circuit with said first variable impedance and connected to be driven by said first motor in a direction toward rebalance of said balanceable circuit upon the selected direction of rotation of said first electric motor,
said remote control and indicator unit including a second electric motor,
a movement indicator connected to be driven by said second electric motor,
cam actuated switch means moved in accordance with said manual indicator,
cam means driven in accordance with said second electric motor and positioned to act on said switch means to open same upon conjunction of the position of said cam means and said switch means,
means to connect said second electric motor in parallel with said first electric motor through said cam actuated switch means, whereby unbalance of said circuit by said first variable impedance establishes selected directional rotation of said first electric motor to rotate said rotator output shaft in a selected direction and to move said second variable impedance in a selected direction toward rebalance of said balanceable circuit and the concurrent rotation of said second electric motor moving said movement indicator to indicate that said rotator is moving and moving said cam means toward a position of actuation of said cam actuated switch means to de-energize said second electric motor upon said movement indicator and said cam means reaching the desired position,
and rebalance of said balanceable circuit de-energizing said relay means to de-energize said first electric motor upon said rotator output shaft reaching said desired position for conjunction of the rotator output shaft position, the manual indicator and the movement indicator.

7. A remote control antenna rotator comprising in combination, a remote control and indicator unit and an antenna rotator unit,
seaid remote control and indicator unit having output terminals and said antenna rotator unit having input terminals, and conductors interconnecting said input and output terminals,
said antenna rotator unit having a first electric motor connected to said input terminals, an output shaft adapted to receive an antenna for rotation thereof and connected for rotation from said motor, said remote control and indicator unit including a balanceable circuit, a first variable impedance in said circuit, a manual indicator knob connected to said first variable impedance, movement of said knob in opposite rotational directions moving said variable impedance in opposite rotational directions to unbalance said circuit in either of two directions, relay means connected to said output terminals of said remote control and indicator unit to control the selected direction of rotation of said first electric motor, said balanceable circuit having an output connected to control said relay means, said antenna rotator unit including a second variable impedance connected to be driven by said first electric motor, means connecting said second variable impedance in circuit with said first variable impedance and connected to be driven by said first motor in a direction toward rebalance of said balanceable circuit upon the selected direction of rotation of said first electric motor, said remote control and indicator unit including a second electric motor, a movement indicator connected to be driven by said second electric motor, cam actuated switch means moved in accordance with said manual indicator knob, cam means driven in accordance with said second electric motor and positioned to act on said switch means to open same upon conjunction of the position of said cam means and said second switch means, means to connect said second electric motor in parallel with said first electric motor through said cam actuated switch means, whereby unbalance of said circuit by said first variable impedance establishes selected directional rotation of said first electric motor to rotate said antenna rotator output shaft in a selected direction and to rotate said second variable impedance in a selected direction toward rebalance of said balanceable circuit and the concurrent rotation of said second electric motor rotating said movement indicator to indicate that said rotator is moving and moving said cam means toward a position of actuation of said cam actuated switch means to de-energize said second electric motor upon said movement indicator and said cam means reaching the desired position, and rebalance of said balanceable circuit de-energizing said relay means to de-energize said first electric motor upon said antenna rotator output shaft reaching said desired position for conjunction of the antenna rotator position, the manual indicator and the movement indicator.

8. A remote control antenna rotator comprising in combination, a remote control and indicator unit and an antenna rotator unit, said remote control and indicator unit having output terminals and said antenna rotator unit having input terminals, and conductors interconnecting said input and output terminals, said antenna rotator unit having a first electric motor connected to said input terminals, an output shaft adapted to receive an antenna for rotation thereof and connected for rotation from said motor, said remote control and indicator unit including a balanceable circuit, a first variable impedance in said bridge circuit, a manual indicator knob connected to said first variable impedance, movement of said knob in opposite rotational directions moving said variable impedance in opposite rotational directions to unbalance said bridge in either of two directions, relay means connected to said output terminals of said remote control and indicator unit to control the selected direction of rotation of said first electric motor, said balanceable circuit having an output connected to control said relay means, said antenna rotator unit including a second variable impedance connected to be driven by said first electric motor, means connecting said second variable impedance in circuit with said first variable impedance and connected to be driven by said first motor in a direction toward rebalance of said balanceable circuit upon the selected direction of rotation of said first electric motor, said remote control and indicator unit including a second electric motor, a movement indicator connected to be driven by said second electric motor, cam actuated second switch means moved in accordance with said manual indicataor knob, cam means driven in accordance with said second electric motor and positioned to act on said second switch means to open same upon conjunction of the position of said cam means and said second switch means, means to connect said second electric motor in parallel with said first electric motor through said cam actuated switch means whereby unbalance of said bridge by said first variable impedance establishes selected directional rotation of said first electric motor to rotate said antenna rotator output shaft in a selected direction and to rotate said second variable impedance in a selected direction toward rebalance of said balanceable circuit and the concurrent rotation of said second electric motor rotating said movement indicator to indicate that said rotator is moving and moving said cam means toward a position of actuation of said cam actuated switch means to de-energize said second electric motor upon said movement indicator and said cam means reaching the desired position, and rebalance of said balanceable circuit de-energizing said relay means to de-energize said first electric motor upon said antenna rotator output shaft reaching said desired position for conjunction of the antenna rotator position, the manual indicator and the movement indicator.

9. A rotator comprising in combination, a first electric motor, an output shaft connected for rotation from said motor, a balanceable circuit, variable impedance means in said circuit, a manual indicator connected to move said variable impedance means, movement of said manual indicator in opposite directions moving said variable impedance means in opposite directions to unbalance said circuit in either of two directions, means connecting said circuit to control the selected direction of rotation of said first electric motor, a second electric motor, a movement indicator connected to be driven by said second electric motor, means to connect said second electric motor for rotation upon rotation of said first electric motor, means to drive said variable impedance means in accordance with rotation of said first motor in a direction toward rebalance of said circuit upon the selected direction of rotation of said first electric motor, whereby unbalance of said circuit by said variable impedance means establishes selected directional rotation of said first electric motor to rotate said rotator output shaft in a selected direction and to move said variable impedance means in a selected direction toward rebalance of said circuit and the concurrent rotation of said second electric motor rotating said movement indicator to indicate that said rotator is moving, and rebalance of said circuit de-energizing said first electric motor upon said rotator output shaft reaching said desired position for conjunction of the rotator position, the manual indicator and the movement indicator.

10. An indicating rotator, comprising in combination,
a balanceable bridge,
means to energize said bridge,
a first electric motor connected to rotate an output shaft of said rotator,
means connecting the output of said bridge to effect rotation of said motor upon unbalance of said bridge,
control means to unbalance said bridge to establish rotation of said output shaft,
impedance means connected in said bridge circuit and connected to be varied in impedance value by said first electric motor toward rebalance of said bridge upon energization of said first electric motor,
a movement indicator,
switch means,
a second electric motor connected in parallel with said first electric motor through said switch means to be energized upon energization of said first electric motor and connected to move said movement indicator,
cam means driven by said second motor to actuate said switch means to the open condition to stop said second motor upon conjunction of said movement indicator and said control means.
and rebalance of said bridge effecting de-energization of said first motor to establish conjunction between said rotator output shaft and said control means to thus establish conjunction between said movement indicator and said rotator output shaft.

11. An indicating rotator, comprising in combination,
a balanceable circuit,
means to energize said balanceable circuit,
a first electric motor connected to rotate an output shaft of said rotator,
means connecting the output of said circuit to effect selected bidirectional rotation of said motor depending upon the direction of unbalance of said circuit,
directional control means to unbalance said circuit in either of two directions to select a desired rotational direction of said output shaft,
impedance means connected in said circuit and connected to be driven by said first electric motor toward rebalance of said circuit upon energization of said first electric motor for a selected rotational direction,
a movement indicator,
switch means,
a second electric motor connected in parallel with said first electric motor through said switch means to be energized upon energization of said first electric motor and connected to move said movement indicator,
means driven by said second motor to actuate said switch means to stop said second motor upon conjunction of said movement indicator and said directional control means,
and rebalance of said circuit effecting de-energization of said first motor to establish conjunction between said rotator output shaft and said directional control means to thus establish conjunction between said movement indicator and said rotator output shaft.

12. An indicating rotator, comprising in combination, a balanceable bridge,
means to energize said bridge, a first electric motor connected to rotate an output shaft of said rotator,
means connecting the output of said bridge to effect selected bidirectional rotation of said motor depending upon the direction of unbalance of said bridge,
directional control means to unbalance said bridge in either of two directions to select a desired rotational direction of said output shaft,
impedance means connected in said bridge circuit and connected to be varied in impedance value by said first electric motor toward rebalance of said bridge upon energization of said first electric motor for a selected rotational direction,
a movement indicator,
switch means,
a second electric motor connected in parallel with said first electric motor through said switch means to be energized upon energization of said first electric motor and connected to move said movement indicator,
cam means driven by said second motor to actuate said switch means to the open condition to stop said second motor upon conjunction of said movement indicator and said directional control means,
and rebalance of said bridge effecting de-energization of said first motor to establish conjunction between said rotator output shaft and said directional control means to thus establish conjunction between said movement indicator and said rotator output shaft.

13. On indicating rotator, comprising in combination, a phase sensitive bridge circuit,
means to energize said phase sensitive bridge circuit,
a first electric motor connected to rotate an output shaft of said rotator,
means connecting the output of said bridge circuit to effect selected bidirectional rotation of said motor depending upon the phase of unbalance of said bridge circuit,
a manual knob,
directional control means moved by said knob to unbalance said bridge circuit in either of two directions to select a desired rotational direction of said output shaft,
impedance means connected in said bridge circuit and connected to be driven by said first electric motor toward rebalance of said bridge circuit upon energization of said first electric motor for a selected rotational direction,
a movement indicator,
switch means,
a second electric motor connected in parallel with said first electric motor through said switch means to be energized upon energization of said first electric motor and connected to move said movement indicator,
cam means driven by said second motor to actuate said switch means to the open condition to stop said second motor upon conjunction of said movement indicator and said manual knob,
and rebalance of said bridge circuit effecting de-energization of said first motor to establish conjunction between said rotator output shaft and said manual knob to thus establish conjunction between said movement indicator and said rotator output shaft.

14. An indicating rotator, comprising in combination, a phase sensitive bridge circuit,
means to energize said phase sensitive bridge circuit,
a first electric motor connected to rotate an output shaft of said rotator,
means connecting the output of said bridge circuit to effect selected bidirectional rotation of said motor depending upon the phase of unbalance of said bridge circuit,
directional control impedance means to unbalance said bridge circuit in either of two directions to select a desired rotational direction of said output shaft, second impedance means connected in said bridge circuit and connected to be driven by said first electric motor toward rebalance of said bridge circuit upon energization of said first electric motor for a selected rotational direction, a movement indicator, switch means, a second electric motor connected in parallel with said first electric motor through said switch means to be energized upon energization of said first electric motor and connected to move said movement indicator, cam means driven by said second motor to actuate said switch means to the open condition to stop said second motor upon conjunction of said movement indicator and said directional control impedance means, and rebalance of said bridge circuit effecting de-energization of said first motor to establish conjunction between said rotator output shaft and said directional control impedance means to thus establish conjunction between said movement indicator and said rotator output shaft.

15. A remote control antenna rotator comprising in combination; a remote control and indicator unit and an antenna rotator unit, said remote control and indicator unit having output terminals and said antenna rotator unit having input terminals, and conductors interconnecting said input and output terminals, said antenna rotator unit having a first electric motor connected to said input terminals, an output shaft adapted to receive an antenna for rotation thereof, a gear reduction unit interconnecting said electric motor and said output shaft for rotation of said output shaft at a slow speed, said remote control and indicator unit including a balanceable AC bridge circuit.

transformer means to energize said bride circuit, manual switch means to energize said transformer and said bridge circuit.

a first potentiometer in said bridge circuit, a manual indicator knob, lost motion means connected between said knob and said first switch means and connected between said manual knob and said potentiometer, movement of said knob in opposite rotational directions moving said potentiometer in opposite rotational directions to unbalance said bridge in either of two phase senses, relay means connected to said output terminals of said remote control and indicator unit to control the selected rotational direction of said first electric motor, said bridge having an output connected to control said relay means, said antenna rotator unit including a second potentiometer connected to be driven by said first electric motor, means connecting said second potentiometer in circuit with said first potentiometer and connected to said first motor to be driven in a direction toward rebalance of said bridge upon the selected direction of rotation of said first electric motor, said remote control and indicator unit including a second electric motor, a movement indicator, a speed reduction unit between said second electric motor and said movement indicator, second switch means moved in accordance with said manual indicator knob, cam means driven in accordance with said second electric motor and positioned to act on said second switch means to open same upon conjunction of the position of said cam means and said second switch means, manual third switch means to terminate output from said bridge, means to connect said second electric motor in parallel with said first electric motor through said second switch means whereby unbalance of said bridge by said first potentiometer establishes selected directional rotation of said first electric motor to rotate said antenna rotator output shaft in a selected direction and to rotate said second potentiometer in a selected direction toward rebalance of said bridge and the concurrent rotation of said second electric motor rotating said movement indicator to indicate that said rotator is moving and moving said cam means toward a position of actuation of said second switch means to de-energize said second electric motor upon said movement indicator and said cam means reach in the desired position, and rebalance of said bridge de-energizing said relay means to de-energize said first electric motor upon said antenna rotator output shaft reaching said desired position for conjunction of the antenna rotator position, the manual indicator and the movement indicator.

References Cited

UNITED STATES PATENTS

| | | | |
|---|---|---|---|
| 1,506,625 | 8/1924 | Forster | 318—19 X |
| 2,368,300 | 1/1945 | Heist | 318—19 X |
| 2,442,997 | 6/1948 | Cooper et al. | 318—19 |
| 2,475,066 | 7/1949 | Wahlberg | 318—19 |
| 3,068,388 | 12/1962 | Burski. | |
| 3,126,506 | 3/1964 | Schneider. | |
| 3,155,892 | 11/1964 | Karlson | 318—207 |
| 2,737,619 | 3/1956 | Shank et al. | 318—207.59 X |
| 2,818,538 | 12/1957 | Kamen et al. | 318—207.59 |
| 3,102,218 | 8/1963 | Dicke | 318—85 X |

THOMAS E. LYNCH, Primary Examiner

U.S. Cl. X.R.

318—29, 85